Patented Oct. 7, 1952

2,613,213

UNITED STATES PATENT OFFICE 2,613,213

PURIFICATION OF TETRAHYDROPHTHALIMIDES WITH ALKALINE EARTH METAL HYDROXIDES

Allen R. Kittleson, Cranford, N. J., assignor to Standard Oil Development Company, a corporation of Delaware No Drawing. Application September 10, 1951, Serial No. 245,979

4 Claims. (Cl. 260—326)

This invention relates to a process for the purification of tetrahydrophthalimides and more particularly to the purification of tetrahydrophthalimides for their use in the preparation of N-thiotrichloromethyl tetrahydrophthalimides.

N-thiotrichloromethyl (or N-trichloromethylthio) tetrahydrophthalimides are disclosed in U. S. Patent No. 2,553,770 as extremely effective parasiticides and especially effective fungicides.

These compounds are prepared by dissolving the desired imide, in an aqueous alkaline solution, followed by addition of about an equal molecular quantity of perchloromethyl mercaptan. The mixture is stirred rapidly, conveniently, until the aqueous medium becomes acid to litmus, then filtered to obtain the product which can be air dried. The reaction may be carried out at room temperature. In cases where the imide is readily hydrolyzed in alkaline solution, it may be advantageous to cool the reaction mixture as low as 0° C.

N-thiotrichloromethyl tetrahydrophthalimide, which is illustrated by Formula I below

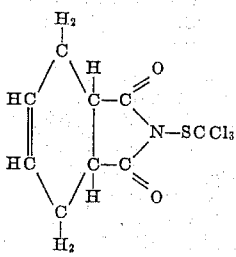

Formula I employs tetrahydrophthalimide as the starting material.

Crude tetrahydrophthalimide may be prepared by a number of means. One of the better ways is by reaction between maleic anhydride and butadiene. The butadiene vapors are passed countercurrently upwardly through downflowing molten maleic anhydride, yielding tetrahydrophthalic anhydride. The latter in the molten state is then passed downwardly countercurrently to upwardly rising ammonia vapors. The product is then heated to maintain the residue in the molten state and to drive off ammonia and water so as to yield the desired tetrahydrophthalimides. The molten tetrahydrophthalimide is thus obtained by whichever process is utilized for its preparation and has a melting point of 135° to 136° C.

There are several possible variations in the preparation of tetrahydrophthalimides. Thus maleic anhydride can be dissolved in a solvent such as benzene and the butadiene bubbled into it. This is done in a stirred reactor with a cooling jacket and the use of excess butadiene. The tetrahydrophthalic anhydride is isolated and dissolved in ammonium hydroxide to form the ammonium salt of the acid amide which after driving off the excess water and heating, yields the imide.

Imides prepared in these manners are of satisfactory purity for most purposes. However, the nature of the impurities present is such as to be particularly and specifically detrimental in the condensation reaction between sodium tetrahydrophthalimide and perchloromethyl mercaptan to give N-trichloromethylthio tetrahydrophthalimide. The mechanism by which these impurities act is not known. However, their presence results in (a) slow rate of reaction between sodium imide and perchloromethylmercaptan, (b) low yields of N-trichloromethylthiotetrahydrophthalimide, (c) an imide-mercaptan reaction mixture difficult to filter and purify.

The impurity may be removed by distillation of the crude imide; however, this procedure is frequently not feasible on a large scale due to the high temperatures and vacuum required. The impurity is similar to the imide with respect to water insolubility, therefore, a simple water washing is not effective.

The low yields obtained are apparently due to a positive poisoning effect of these impurities rather than the mere decrease in concentration of the active reactants. This positive poisoning effect has been established by experiments wherein some of this impurity was deliberately added to the indicated reaction system and significant decreases in yields thereby obtained.

The present invention is an improved method for the purification of tetrahydrophthalimides which is ideally adapted to overcome the beforementioned difficulties. The method comprises adding an alkaline earth metal hydroxide to the crude imide dissolved in hot water, i. e., at a temperature of about 75° to 100° C. This results in the precipitation of the insoluble alkaline earth salt of the impurity or impurities. The impurities are then separated from the hot solution, preferably by filtration. The imide then separates out of the aqueous filtrate by cooling the latter to a temperature of about 15° to 30° C.

The imide in the filtrate need not be isolated for subsequent reactions to form N-trichloromethylthiotetrahydrophthalimide.

The calcium, barium and strontium hydroxides can be utilized in the process of this invention. Because of cost considerations the calcium compound is preferred. The lime [Ca(OH)₂] may be added as a dry powder to the hot aqueous imide solution, or, if more convenient, as a concentrated aqueous slurry.

It is also preferable to regulate the amount of alkaline earth metal hydroxide employed so as to prevent any imide losses. The regulation of the amount of hydroxide is possible because of the fact that it has been learned that the impurities are acidic in character. Thus a slurry of purified imide in water has a pH of 7 to 7.5, whereas the crude imide in a water slurry has a pH of about 3 to 4. It is thus possible to determine the mol per cent impurity by titrating a crude imide sample up to a pH of about 7.5. The calcium hydroxide is then added in approximately the same molar quantity as the impurity present (see Example I below).

It is possible to remove the impurities by treating a dispersion of the crude imide in water with a sufficient quantity of sodium hydroxide or any other alkali metal hydroxide which will form a water-soluble salt of the impurity to increase the pH of the slurry to 7.5. The mixture is then filtered and the residual purified imide washed with a small quantity of water. This method, though effective, results in loss of imide dissolved in the water (solubility=2-2.5% at 25° C.). Also it is necessary to isolate the imide from the water slurry, which involves considerable handling on a large scale. This method is therefore not as desirable as the alkaline earth metal hydroxide process detailed above.

The improved method of this invention is illustrated by the following example:

*Example I*

A sample (15 g.) of crude tetrahydrophthalimide was dispersed in water at room temperature and the pH of the aqueous slurry found to be 3.8. Standard NaOH was added to the slurry until the pH had increased to 8.5; this required 40.5 cc. of 0.1408 N NaOH. This indicates that the crude imide contains 5.7 mol per cent of material titrating below a pH of 8.5 (assuming one acidic group per molecule). This titration was then used as a basis for estimating the quantity of lime to be added in the imide purification procedure.

155 g. of crude tetrahydrophthalimide (from same source as above sample) and 3.8 g. of Ca(OH)₂ were added to 600 cc. of water and the mixture heated to 95° C. for 10 minutes. The imide solution was filtered hot, to remove the insoluble calcium salt of the impurity, and the filtrate cooled to 150° C. The pH of the cooled filtrate was found to be 7.3. The cooled imide slurry thus treated is converted to its sodium salt and reacted with perchloromethyl mercaptan to form N-trichloromethylthiotetrahydrophthalimide.

*Example II*

A crude imide was converted to the alkali metal salt, which was then reacted with perchloromethyl mercaptan so as to prepare compound N-trichloromethylthiotetrahydrophthalimide. The time required for the completion of the reaction, for the filtration and the yield was determined. Another sample of crude imide was treated with calcium hydroxide as taught in this invention and Example I. After this latter treatment the imide was reacted to form N-trichloromethylthiotetrahydrophthalimide in exactly the same manner as the crude imide not subjected to the treatment of this invention. The results are listed below:

| Imide | Time Required for Completion of Na Imide + ClSCCl₃ Reaction | N-trichloromethylthiotetrahydrophthalimide | |
|---|---|---|---|
| | | Time Required for Filtration | Yield |
| | *Minutes* | *Minutes* | *Percent* |
| Crude | 70+ | 70 | 78 |
| Crude—treated with Ca(OH)₂ | 31 | 19 | 87.6 |

The improvement in time of reaction, time required for filtration and yield is so clear cut as to require no comment.

The process of this invention is applicable to the purification of other tetrahydrophthalimides such as endomethylene tetrahydrophthalimide, and other products obtained from condensation of a diene and maleic anhydride followed by condensation with ammonia (for example, the imide of the adduct of isoprene with maleic anhydride).

It is apparent that the indicated separations obtained by filtration can also be accomplished by a wide variety of other filtering, settling and decanting means.

It is to be understood that the invention is not limited to the specific examples, which have been offered merely as illustrations, and that modifications may be made without departing from the spirit of this invention.

What is claimed is:

1. A process for the purification of a tetrahydrophthalimide which comprises the steps of dissolving the crude imide in water maintained at a temperature in the range of about 75° to 100° C., adding an alkaline earth metal hydroxide to the resulting solution maintained in the same temperature range so as to precipitate water-insoluble impurities therefrom, and separating the impurities while hot from the residual solution so as to leave a purified tetrahydrophthalimide solution.

2. A process as in claim 1 in which the alkaline earth metal hydroxide is added in an amount about equivalent to the mol per cent impurity in the crude imide as determined by titrating a solution of the latter up to a pH in the range of about 7.0–7.5.

3. A process as in claim 2 in which the alkaline earth metal hydroxide is calcium hydroxide.

4. A process for the purification of tetrahydrophthalimide which comprises the steps of dissolving crude tetrahydrophthalimide in water maintained at a temperature in the range of 75° to 100° C.; adding to this solution maintained at approximately the same temperature calcium hydroxide in an equivalent amount to the mol per cent impurity in the crude imide as determined by titrating a crude imide sample up to a pH of about 7.5, so as to precipitate water-insoluble calcium salt impurities; filtering the resulting system maintained at approximately the same temperature as in the preceding step so as to remove the water-insoluble calcium salts of the impurities therefrom; and cooling the residual aqueous filtrate to approximately 15° to 30° C. to crystallize the purified tetrahydrophthalimide out of solution.

ALLEN R. KITTLESON.

No references cited.